Oct. 20, 1931.    F. W. DOUTHITT    1,828,649
CUTTER HEAD FOR CORN CUTTING MACHINES
Original Filed Nov. 25, 1929
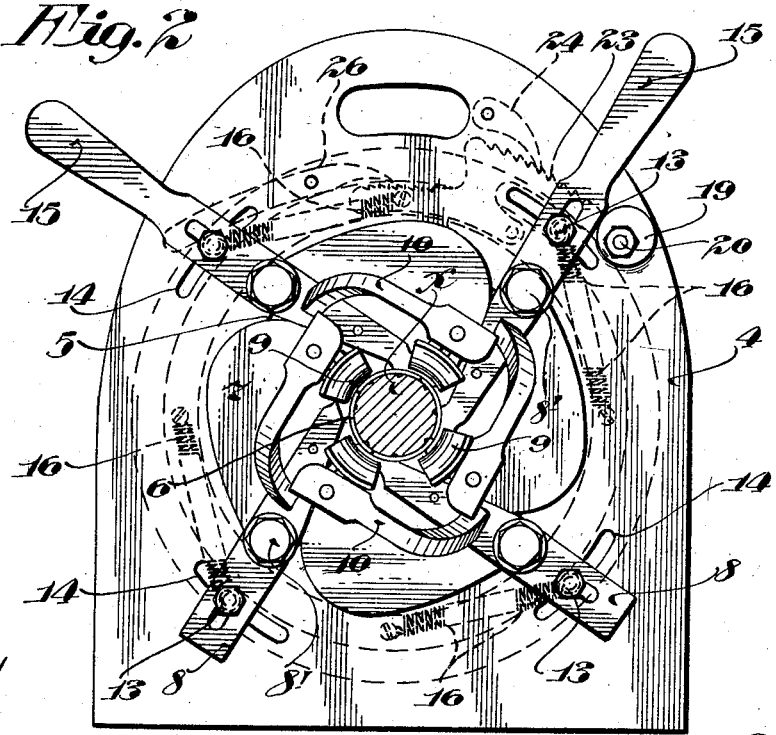
Inventor
Frank W. Douthitt
By his Attorneys
Merchant & Merchant Patented Oct. 20, 1931

1,828,649

UNITED STATES PATENT OFFICE

FRANK W. DOUTHITT, OF ORTONVILLE, MINNESOTA

CUTTER HEAD FOR CORN CUTTING MACHINES

Application filed November 25, 1929, Serial No. 409,505. Renewed March 6, 1931.

My present invention has for its object to provide a highly efficient cutter head for general use in connection with various different types of corn cutting machines for removing kernels of green corn from their cobs and is in the nature of an improvement on or a refinement of the cutter head disclosed and broadly claimed in my pending application Serial Number 393,430, filed September 18, 1929, and entitled "Cutter head for corn cutting machines".

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a front elevation of the cutter head removed from the corn cutting machine, some parts shown in different positions by means of broken lines and further showing in section an ear of corn in said head;

Fig. 2 is a rear elevation of the parts shown in Fig. 1; and

Fig. 3 is a fragmentary detail view principally in section taken on the line 3—3 of Fig. 1.

The numeral 4 indicates a body member in the form of an upright flat plate having a transverse feed passageway 5 and adapted to be mounted on a corn cutting machine, not shown. Axially aligned with the axis of the feed passageway 5, at the inner face of the body member 4, is an iris cutter having four blades 6 and an iris-like diaphragm having a corresponding number of shutters 7. These cutter blades 6 and shutters 7 are carried by four radially extended levers 8 intermediately attached to the inner face of the body member 4, for oscillatory movement in a plane parallel thereto, by shouldered pivot bolts 8' passed through bossed openings in said member and levers. The segmental cutter blades 6 are circumferentially spaced in tubular formation about the axis of the passageway 5. The purpose of the iris-like diaphragm 7 is to prevent kernels of corn from following the cobs as they are cut therefrom to prevent waste.

Cooperating with the cutter blades 6 is an iris depth gauge 9 automatically controlled by an ear of corn X passing through said cutter. This depth gauge 9 comprises four circumferentially spaced segmental sections carried by curved secondary arms 10 on the inner arms of the levers 8.

The levers 8 are connected for simultaneous movement by an annular outer or shift ring 11 mounted in an annular channel seat 12 in the outer face of the body member 4 and to which ring said levers are pivotally connected by shouldered bolts 13 which extend through circumferentially extended slots 14 in said body member and bores in the shift ring 11. Handles 15 forming extensions on the outer arms of the two upper levers 8 afford means by which said levers may be manually manipulated to expand the cutter blades 6, diaphragm 7 and depth gauge 9.

Four relatively stiff coiled springs 16, under strain to turn the shift ring 11 in the direction of the arrow marked thereon in Fig. 1, are provided to simultaneously operate the levers 8 to contract the cutter blades 6, diaphragm 7 and depth gauge 9. One of the ends of these springs 16 is attached to the bolts 13 and their other ends are anchored to screws 17 in an annular inner or anchor ring 18 mounted in the channel seat 12 concentric with the shift ring 11. The nut-equipped bolts 13 hold the shift ring 11 in the channel seat 12 and washers on the pivot bolts 8' hold the anchor ring 18 in said seat. These springs 16 will, of course, yield and permit a backward movement of the shift ring 11 when the levers 8 are operated by the expanding movement of the depth gauge 9 produced by an ear of corn X as the same is fed therethrough.

For the purpose of this case it is not thought necessary to show the mechanism for feeding an ear of corn through a cutter head. Neither is it thought necessary to show the grippers for holding an ear of corn aligned with the cutter head and positioned to be engaged by the feeding mechanism. During the feeding movement of an ear of corn into the depth gauge 9 said gauge is expanded and thereby automatically positions the cutter blades 6 for action to cut the kernels of corn from the cob at the desired depth and also simultaneously operate the diaphragm 7 to close the feed passageway 5 and prevent the kernels of corn from following the cob therethrough.

To limit the contracting movement of the cutter blades 6 there is provided a pivoted eccentric 19 secured to the body member 4 by a nut-equipped bolt 20 in different circumferentially set positions and arranged to be engaged by the upper right hand lever 8, as shown in Fig. 2. The purpose of limiting the contracting movement of the cutter blades 6 is to prevent unnecessary movement thereof when cutting the kernels from large ears of corn X. For instance, in the early part of the season when the ears are small the eccentric 19 may be adjusted to permit the cutter blades 6 to contract to a small diameter but as the season advances and the ears of corn increase in size the eccentric may be adjusted to limit this contracting movement of said cutter blades. During the adjustment of the eccentric 19 the cutter blades 6 may be expanded to the desired diameter by manipulating one of the handles 15.

The anchor ring 18 is held against rotation in the direction of the pull of the springs 16 and in different rotated positions by a latch device. This latch device includes a plate 22 rigidly secured to the anchor ring 18 and having a circumferentially extended ratchet bar 23 and a cooperating pawl 24 is pivoted to the body member 4 and gravity held in engagement with said ratchet bar. The teeth on the ratchet bar 23 and pawl 24 are arranged to resist the pulling action of the springs 16. By turning the anchor ring 18 the rack bar 23 may be positioned in different adjustments in respect to the cooperating pawl 24 to vary the tension of the springs 16.

For turning the anchor ring 18 to tension the springs 16 the latch plate 22 is further provided with a second ratchet bar 25 and a cooperating pawl 26 is pivoted to the shift ring 11. The teeth of the ratchet bar 25 project in the same direction as the teeth of the ratchet bar 23 and in a broad sense the two ratchet bars 23 and 25 may be considered as a single ratchet. The pawl 26 is normally gravity held in an inoperative position and is free to move with the shift ring 11 during the expansion and contraction of the cutter blades 6.

To shift the position of the anchor ring 18 in the body member 4 to decrease the tension of the springs 16, the handles 15 are first moved to the right in respect to Fig. 1 to open the iris-like cutter and thereafter the pawl 26 is moved into engagement with the ratchet bar 25 to temporarily lock the rings 11 and 18 together against the action of the springs 16. The pawl 24 is then moved out of engagement with the ratchet bar 23 and the connected rings turned to the left by means of the handles 15 which moves the ratchet bar 23 in respect to the pawl 24. The pawl 24 is then moved into engagement with the underlying tooth in the ratchet bar 23 to again lock the anchor ring 18 to the body member 4 and the pawl 26 moved out of engagement with the ratchet bar 25 to release the shift ring 11 from the anchor ring 18. Pressure on the handles 15 is then released to allow the springs 16 which are held by the anchor ring 18 to turn the shift ring 11 to the left and thereby close the cutter. It will thus be seen that this adjustment has moved the anchor ring 18 to the right in respect to normal position of the shift ring 11 and thereby position the two attachment points of the springs 16 with the rings closer together and hence shorten said springs.

To increase the tension of the springs 16 it is only necessary to move the pawl 26 into engagement with the ratchet bar 25 to lock the two rings together and then operate the handles 15 to move the connected rings 11 to the left in respect to Fig. 1 and the ratchet bar 23 in respect to the pawl 24 and at which time the pawl 24 will ride over the ratchet teeth 23 and engage one thereof when the pressure on the handles 15 is released. At the completion of the increasing of the tension of the springs 16 the pawl 26 is moved out of engagement with the ratchet bar 25 to release the ring 11 from the ring 18 and again lock the ring 18 to the body member 4. The pressure on the handles 15 is then released to allow the springs 16 which are held by the anchor ring 18 to move the shift ring 11 to the left and close the cutter. This adjustment of the shift ring 18 in respect to the shift ring 11 will increase the distances between the points of attachment of the springs 16 with the two rings 11 and 18 and thereby increase the length of said springs, and hence, the tension thereof.

The ratchet bar 25 and cooperating pawl 26 also afford convenient means by which the cutter may be held open without extra expansion of the springs 16 when it is necessary to inspect, repair or adjust the cutter blades 6, diaphragm 7, or depth gauge 9. It will be noted from the above that a cutter head has been provided wherein the control ring and springs associated therewith for shifting the cutters and for holding said cutters in set position, and also the anchor ring for varying the tension on the springs holding the cutters in contracted position, are all in rear of the supporting plate and fully protected from the juices of the food product operated upon. In the present embodiment of the invention the levers supporting the knives and the depth gages are on the front of the supporting plate which makes a very strong and durable support therefor. The supporting plate carries all of the operating parts of the cutter and it can be readily removed from the machine as a unit and replaced therein. This makes the cutting units readily interchangeable and replaceable in the machine which supports and feeds the ears thereto.

What I claim is:

1. A head of the class described, comprising a body member, a shift ring and an anchor ring relatively turnably mounted on the body member, an iris-like cutter mounted on the body member, the members of said cutter being connected to the shift ring and held thereby for common opening and closing movements, a spring connecting said two rings and under strain to normally hold the shift ring with the iris-like cutter contracted, and adjustable means normally holding the anchor ring from turning in respect to the body member and operable to tension said spring.

2. A head of the class described, comprising a body member, a shift ring and an anchor ring relatively turnably mounted on the body member, an iris-like cutter mounted on the body member, the members of said cutter being connected to the shift ring and held thereby for common opening and closing movements, a spring connecting said two rings and under strain to normally hold the shift ring with the iris-like cutter contracted, and a ratchet on the anchor ring and a cooperating pawl on the body member for holding the anchor ring from turning in respect to the body member, and for holding the anchor ring in different circumferential adjustments to vary the tension of the springs.

3. The structure defined in claim 2 further including a normally released pawl on the shift ring for cooperation with the ratchet for temporarily and adjustably connecting the two rings for common turning movement in respect to the pawl on the body member to vary the tension of the spring.

4. A head of the class described, comprising a body member, concentric inner and outer rings relatively turnably mounted on the body member, an iris-like cutter, the members of which are mounted on the body member and connected to the outer ring and held thereby for common opening and closing movements, a plurality of circumferentially spaced springs connecting the two rings and under strain to normally hold the outer ring with the iris-like cutter contracted, a ratchet on the inner ring, and a cooperating pawl on the body member normally holding the outer ring from turning in respect to the body member and for holding the inner ring in different circumferential adjustments in respect to the outer ring and body member to tension the springs.

5. The structure defined in claim 4 further including a normally released second pawl on the shift ring cooperating with the ratchet for temporarily and adjustably connecting the two rings for common turning movement in respect to the pawl on the body member to vary the tension of the springs.

6. A cutter head for corn cutting machines comprising a supporting plate having a central opening therethrough, a series of levers pivotally attached to said supporting plate and movable in a plane parallel with the face of the plate, a cutting blade carried by each of the plate, a cutting blade carried by said levers, a depth lever, arms carried by said levers, a depth gage carried by each arm, a control ring mounted on the back of said plate and connected to each lever, an anchor ring mounted on the back of said plate, springs connecting said anchor plate to said control plate, and means for holding said anchor plate in different set positions whereby the tension on said springs may be varied.

7. A cutter head for corn cutting machines comprising a supporting plate having a central opening therethrough, a series of levers pivotally attached to said supporting plate and movable in a plane parallel with the face of the plate, a cutting blade carried by each lever, arms carried by said levers, a depth gage carried by each arm, a control ring mounted on the back of said plate and connected to each lever, an anchor ring mounted on the back of said plate, springs connecting said anchor plate to said control plate, means for holding said anchor plate in different set positions whereby the tension on said springs may be varied, and means carried by the control plate for holding said control plate in different set positions with the cutting blades in expanded position.

8. A cutter head for corn cutting machines comprising a supporting plate having a central opening therethrough, a series of levers pivotally attached to said supporting plate and movable in a plane parallel with the face of the plate, a cutting blade carried by each lever, arms carried by said levers, a depth gage carried by each arm, a control ring mounted on the back of said plate and connected to each lever, an anchor ring mounted on the back of said plate, springs connecting said anchor plate to said control plate, a pawl carried by the supporting plate and adapted to engage a toothed face on the bracket for holding the anchor plate in different set positions whereby the tension on the springs may be varied.

9. A cutter head for corn cutting machines comprising a supporting plate having a central opening therethrough, a series of levers pivotally attached to said supporting plate and movable in a plane parallel with the face of the plate, a cutting blade carried by each lever, arms carried by said levers, a depth gage carried by each arm, a control ring mounted on the back of said plate and connected to each lever, an anchor ring mounted on the back of said plate, springs connecting said anchor plate to said control plate, a pawl carried by the supporting plate and adapted to engage a toothed face on the bracket for holding the anchor plate in different set positions whereby the tension on the springs may be varied, a pawl carried by said control ring and adapted to engage a toothed face on said bracket for holding said control ring in different set positions, and the cutters in an expanded position.

In testimony whereof I affix my signature.

FRANK W. DOUTHITT.